United States Patent [19]

Okada

[11] Patent Number: 4,843,822

[45] Date of Patent: Jul. 4, 1989

[54] TURBO COMPOUND ENGINE

[75] Inventor: Masaki Okada, Kawasaki, Japan

[73] Assignee: Isuzu Motors Limited, Tokyo, Japan

[21] Appl. No.: 226,176

[22] Filed: Jul. 29, 1988

[30] Foreign Application Priority Data

Jul. 30, 1987 [JP] Japan .................... 62-188747

[51] Int. Cl.⁴ .............................. F02G 5/00
[52] U.S. Cl. ........................... 60/614; 60/624
[58] Field of Search .............. 60/605, 624, 614

[56] References Cited

U.S. PATENT DOCUMENTS

| 2,375,852 | 5/1945 | Kilchenmann | 60/624 X |
| 4,748,812 | 6/1988 | Okada et al. | 60/624 X |
| 4,800,726 | 1/1989 | Okada et al. | 60/614 |

FOREIGN PATENT DOCUMENTS

| 56341 | 12/1983 | Japan | 60/624 |
| 61921 | 3/1986 | Japan | 60/624 |
| 286531 | 12/1986 | Japan | 60/624 |
| 57824 | 3/1988 | Japan | |
| 85222 | 4/1988 | Japan | |

Primary Examiner—Michael Koczo
Attorney, Agent, or Firm—Dykema Gossett

[57] ABSTRACT

A turbo compound engine comprising an engine having an output shaft and an exhaust line, a power recovering turbine disposed at the exhaust line, a gear train connecting the power recovering turbine with the output shaft of the engine, and a power reversing mechanism including a hydraulic clutch provided with the gear train, so that energy utilized by the power turbine may serve as braking effort against the vehicle upon switching of the power reversing mechanism, and a large load may not be applied to the gear train all at once by allowing the hydraulic clutch to slip during a certain period from the switching of the power reversing mechanism, thereby protecting the drive power transmission system of the vehicle and improving driveability.

11 Claims, 3 Drawing Sheets

TURBO COMPOUND ENGINE

BACKGROUND OF THE INVENTION

The present invention relates to a turbo compound engine of a vehicle, which is capable of recovering the energy of exhaust gas as expansion work of a power turbine and transmitting the recovered energy to a drive shaft such as a crank shaft of the engine by a gear train, so as to rotate the power turbine in a reverse sense upon deceleration of the vehicle in order to obtain braking effort. In particular, it relates to a turbo compound engine provided with a gear train having a clutch to absorb a large load produced when the power turbine is rotated in reverse sense.

Recently in Japan, turbo compound engines which recover exhaust gas energy from the engine as supercharging energy of a turbo charger and exhaust gas energy from the turbocharger as diabatic expansion energy of a power turbine have been developed.

In such turbo compound engines, the power output performance, fuel consumption rate, and gain of the engine are improved by raising expansion ratios of the turbo charger and the power turbine. On the other hand, however, it remains a problem to secure an adequate braking effort (for example, by means of exhaust brake) to counterbalance the increased power output of the engine. In other words, the braking effort against the engine suffers a decrease because of increased turbocharged pressure, so that a main brake (i.e., foot brake) must be manipulated in order to offset the relative decrease of entire braking force. Guaranteeing sufficient braking force is important not only for the maneuverability and safety of the vehicle (engine brake force of approximately more than 60% of the rated output power is required), but also for utilizing the turbo compound engine more effectively.

Thereupon, the present assignee has proposed a "Turbo Compound Engine" disclosed in Japanese Patent Application No. 61-228107 (228107/1986).

In this proposal, as shown in FIG. 3 of the accompanying drawings, a power turbine a for recovering the exhaust gas energy is disposed in an exhaust passage b1 of a vehicle, and a fluid passage c3 is connected to an exhaust passage b2 upstream of the power turbine a so as to bypass the power turbine a. A fluid passage switching means e is provided at the junction of the exhaust passage b1 and the fluid passage c so that it may close the passage b1 upstream of the fluid passage c while opening the fluid passage c when the vehicle is in a deceleration mode and the driving power is transmitted from the crankshaft d to the power turbine a.

This construction makes it possible for the power turbine to recover the exhaust gas energy from the engine so as to utilize the recovered energy as driving energy of the engine during normal driving.

During exhaust braking and when the clutch of the vehicle is engaged, the fluid passage switching means e closes the exhaust passage b1 upstream of the fluid passage c while connecting the passage b2 to the passage c with the junction of the two passages being throttled. At the same time, the rotation of the crankshaft d is transmitted via one of the gear trains to the power turbine a, with the rotation reversed by the gear train. Accordingly, the power turbine a, which is originally designed for energy recovery, performs pumping work i.e., the power turbine compresses the air from the exhaust passage b2 into the fluid passage c. Therefore, it is possible to obtain a large braking effort including motor friction of the engine, negative work upon pumping work by the power turbine, and the exhaust braking force during exhaust braking.

However, the power turbine rotates at a revolution speed ranging from 80,000 to 100,000 r.p.m. during normal driving of the vehicle, and the rotation energy at such a rotating speed is equivalent to the moment of inertia (polar moment of inertia of area) of the flywheel of the normal engine. Hence, when the rotation of the power turbine is switched from normal rotation to reverse rotation, considerable amount of energy has to be consumed somewhere between the crankshaft and the power turbine.

It has been learned through experimentation that the magnitude of the energy becomes maximum when it takes relatively short time (2-3 seconds) from the beginning of the reversing until the power turbine reaches its maximum speed in reverse sense. Thus, what is needed is a turbo compound engine which can absorb the energy by certain means disposed between the crankshaft and the power turbine.

When the rotation of the power turbine is reversed the following shortcomings appear unless the energy is absorbed (in a case where elements between the power turbine and the crankshaft are sufficient in strength).

(1) The vehicle skids momentarily.

(2) An anti-driving force upon skidding exerts an extremely large load on the driving system of the vehicle.

(3) An abnormal abrasion of tires, and brake pads or shoes occurs.

(4) Comfortableness in riding is deteriorated.

SUMMARY OF THE INVENTION

One object of this invention is to provide a turbo compound engine including two gear trains for connection of a power recovering turbine disposed in the exhaust line of the engine with the output shaft of the engine so that the transmission direction of the driving power may be reversed and a temporarily rapidly increasing large load may not be produced upon switching of the gear trains into a reverse mode, whereby duration of the drive power transmitting system and driveability of the vehicle are improved.

The turbo compound engine of the present invention includes power reversing means in the gear train connecting the output shaft of the engine with the power turbine, the power reversing means having a hydraulic clutch which slips upon connection of the hydraulic clutch so that the large energy produced when the power turbine is rotated in a reverse sense by the hydraulic clutch.

In order to accomplish the above object, according to the present invention, there is provided a turbo compound engine including a planetary gear in a gear train connecting the crankshaft to the power turbine upon connection of the hydraulic clutch so that the planetary gear may reverse the rotation from the crankshaft.

During deceleration of the vehicle, when the hydraulic clutch is engaged the power turbine is rotated in reverse sense by the planetary gears. While the power turbine is between normal rotation and reverse rotation, slippage occurs in the hydraulic clutch, whereby energy produced between the crankshaft and the power turbine is absorbed.

DESCRIPTION OF THE PREFERRED EMBODIMENT

A preferred embodiment of the turbo compound engine of the present invention will be described with reference to the accompanying drawings.

Figure 1:
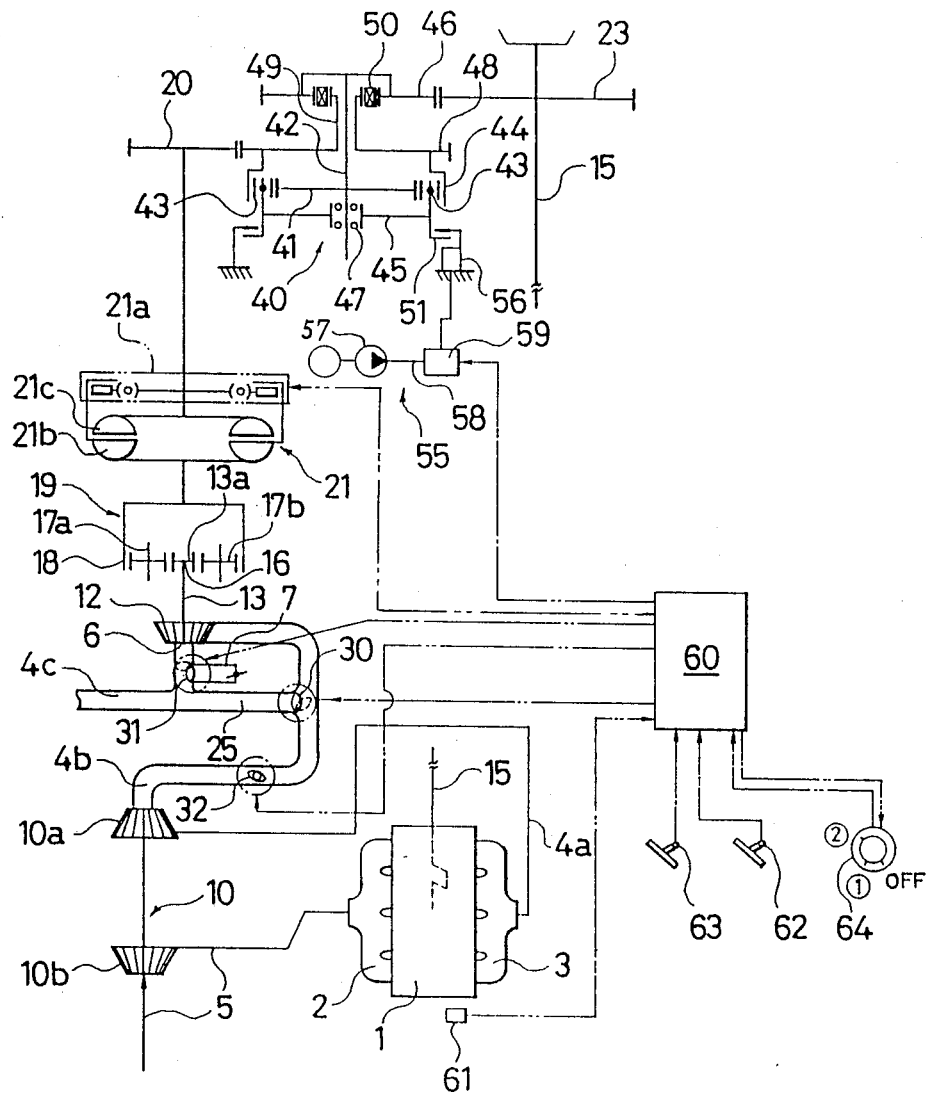
FIG. 1 is a system diagram of a preferred embodiment of a turbo compound engine according to the present invention.

In FIG. 1, reference numeral 1 indicates an engine of a vehicle (not shown), 2 the intake manifold of the engine 1, and 3 the exhaust manifold of the engine 1.

As depicted in FIG. 1, an exhaust gas passage 4a is connected to the exhaust manifold 3, and to the intake manifold 2 there is connected an intake-air passage 5. A turbine 10a of the turbocharger 10 is disposed at an intermediate point in the exhaust passage 4a while the compressor 10b of the turbocharger 10 is disposed in the intake passage 5. In an exhaust passage 4b downstream of the turbocharger 10, a power turbine 12 is disposed for recovering the exhaust gas energy. A fluid passage 25 is branched from the exhaust gas passage 4b between the power turbine 12 and the turbine 10a of the turbocharger 10 and connected to the passage 4c downstream of the power turbine 12. At the junction of the passage 4b and the fluid passage 25 upstream of the power turbine 12, there is provided a passage switching means 30 for closing the fluid passage 25 while throttling the passage 4b to a predetermined degree. The switching means 30 is constructed in such fashion that it has at least two switching positions. An external atmosphere conduit 7 is connected the exhaust passage 4c connection gate fluid passage 25 to the outlet port 6 of the power turbine 12. At the intersection of the passage 7 and 4c there is disposed switching means 31, which opens the external atmosphere conduit 7 upon closing of the exhaust gas passage 4c. Moreover, an exhaust brake valve 32 is provided in the passage 4b between the switching valve 30 and the turbine 10a.

Now, gear trains for connecting the power turbine 12 to the crankshaft 15 will be explained.

As shown in FIG. 1, an output gear 16 is disposed at the end 13a of the shaft 13 of the power turbine 12, and planetary gears 17a and 17b are engaged therewith. The planetary gears 17a and 17b are engaged with a ring gear 18 which rotates together with an input pump wheel 21b of a fluid coupling 21 provided with a locking-up mechanism 21a. In other words, the output gear 16 is connected to the fluid coupling 21 via the planetary gear mechanism 19 including the planetary gears 17a and 17b, so that the rotation of the power turbine 12 is transmitted to an output pump wheel 21c of the fluid coupling 21. The epicyclic gear 19 is employed because it has a large moderating ratio and a high transmission efficiency. To the output pump 21c there is fixedly provided a gear 20 which rotates with the pump 21c, and to the crankshaft 15 there is fixedly provided a crankshaft gear 23.

Another epicyclic gear 40 for connecting the crankshaft 23 with the gear and for rotating the power turbine 12 in both normal and reverse senses will now be explained.

The epicyclic gearing 40 comprises a sun gear shaft 42, a sun gear 41, a ring gear 44 engaged with plural planetary gears 43 at intervals in the circumferential direction thereof and surrounding circumferentially the sun gear 41, and a carrier 45 for maintaining the relative relationship of position between the planetary gear 43 and the sun gear 41 at constant while rotating the planetary gear 43 around the sun gear 41 autorotationally as well as revolutionally.

Now, the epicyclic gear 40 will be explained in depth.

The sun gear shaft 42 is provided with a first transmission gear 46 engaged with the crankshaft gear 23 at one end thereof, and supports said carrier 45 via a bearing 47 near the other end thereof. On the other hand, the ring gear 44 is provided with a second transmission gear 48 engaged with the gear 20. The second transmission gear 48 includes a hollow shaft 49 housing a part of the sun gear shaft 42 between the first and second trnsmission gears 46 and 48. The hollow shaft 49 rotates about the shaft 42 and is provided with a one way clutch 50. The one way clutch 50 connects the first transmission gear 46 with the shaft 49 only when drive power is transmitted from the gear 46 to the crankshaft 15. The carrier 45 includes a clutch element 51 extending radially outwardly.

The direction of rotation of the epicyclic gear 40 is controlled by hydraulic clutch means 55. In this embodiment, the clutch means 55 includes a hydraulic clutch 56 which can be connected to clutch element 51 so as to stop the carrier 45 furing engagement, a pump 57 supplying working oil to the hydraulic clutch 56, a valve 59 disposed in a working oil conduit 58 connecting the pump 57 with the hydraulic clutch 56, and a controller 60 controlling the valve 59.

An ON-OFF signal from a clutch switch 62 of the engine 1, an ON-OFF signal from an accelerator switch 63, a rotating speed signal from rotating speed sensor 61 of the engine 1, and a brake control signal from a brake control switch 64 are input to the controller 60 while control signals are output from the controller 60 to the switching valves 30 and 31, the exhaust brake valve 32, a lock-up mechanism 21a of a fluid coupling 21, and the valve 59. The brake control switch 64 of the illustrated embodiment has an OFF position, a position 1, and a position 2. At position 1 the controller 60 outputs a command signal to fully close the exhaust brake valve 31 only, and at position 2 the same outputs a command signal to close the exhaust passage 4c while opening the air inlet passage 7, a command signal to actuate the switching valve 30 of the fluid passage 25 to a predetermined extent for throttling, a command signal to fully close the valve 59 of the hydraulic clutch 56, and a command signal to cancel locking-up of the locking-up mechanism 21a. When the brake control switch 64 supplies an instruction to the controller 60 for the OFF position, the controller 60 supplies command signals to the switching valve 30 for full closing of the fluid passage 25, to the switching valve 31 for full closing of the external atmosphere duct 7, to the locking-up mechanism 21a for locking-up, and to the valve 59 for full closing so as to allow the hydraulic clutch 56 to be free from the clutch element 51.

Figure 2:
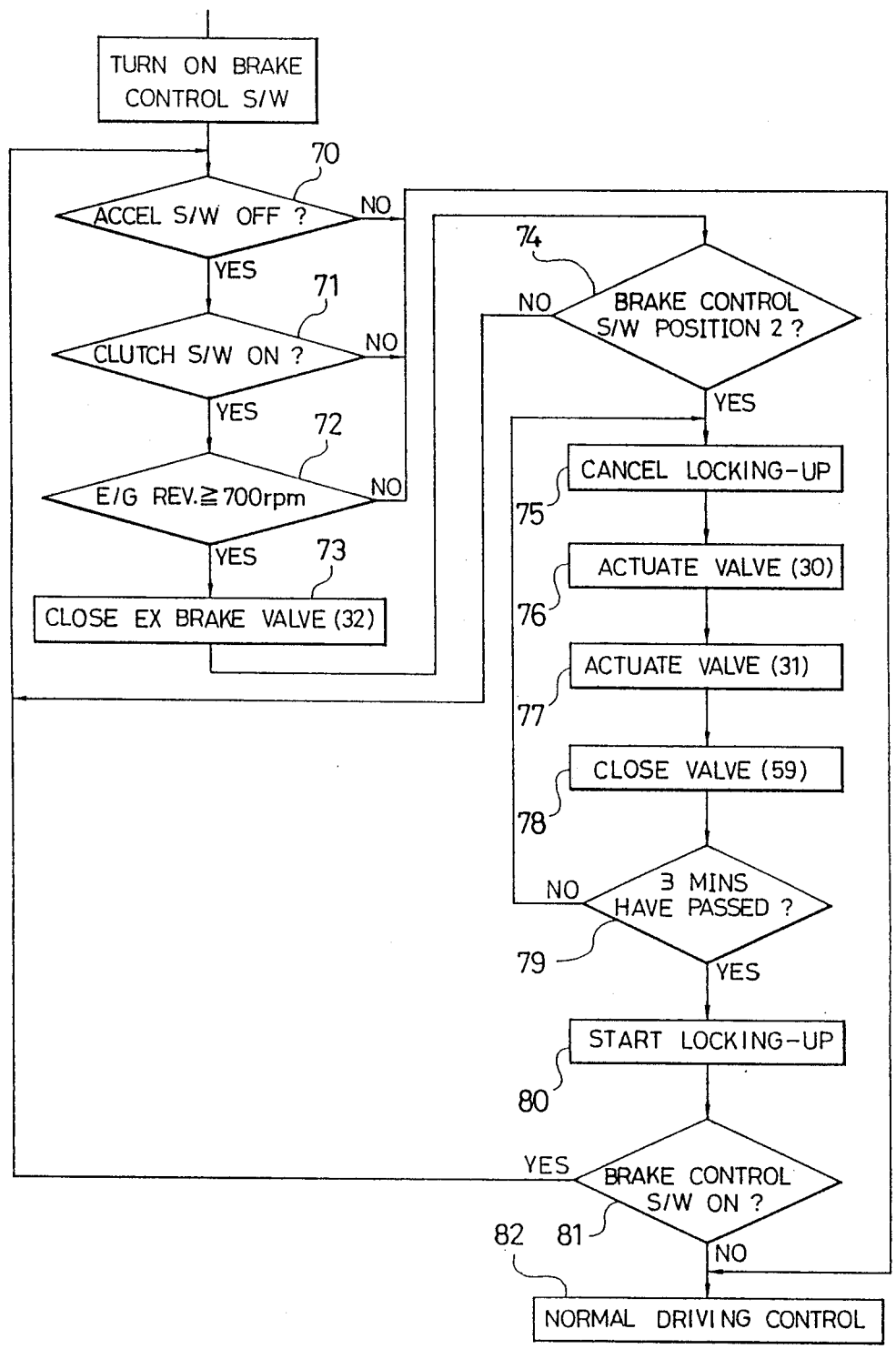
FIG. 2 is a flow chart for the turbo compound engine of FIG. 1.
Figure 3:
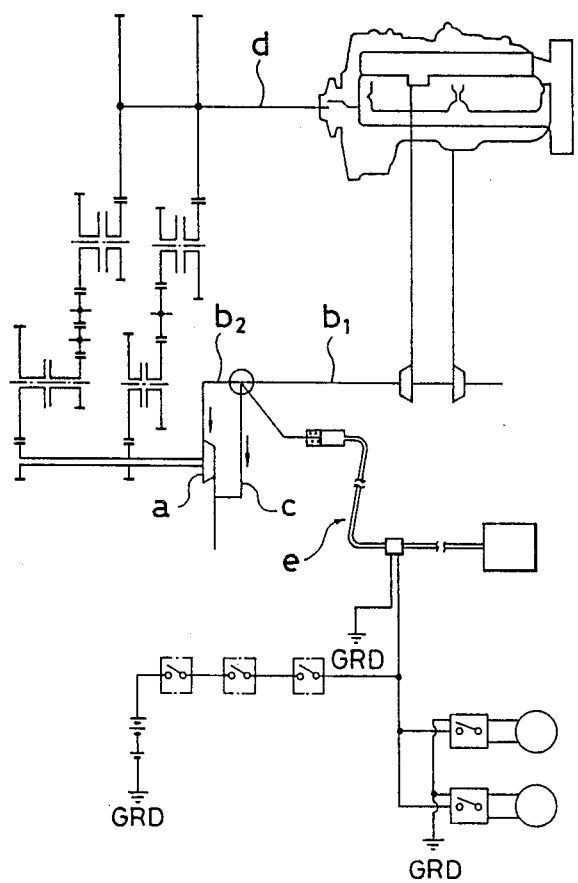
FIG. 3 is a schematic view showing a related art.

Now control by the controller 60 during deceleration of the vehicle will be described with reference to FIG. 2.

In the controller 60 during normal driving, a determination is made as to whether the accelerator switch 63 is OFF at step 70, if the clutch switch 62 is ON at step 71, and if engine revolution speed is equal to or higher than 700 r.p.m. at step 72. When answers at the steps 70, 71, and 72 are all YES, the controller 60 thinks that the vehicle is decelerated, and then following steps are executed. First, the exhaust brake valve 32 is fully closed at step 73 so as to increase the exhaust gas pressure, then it is determined whether the brake control switch 64 is in position 2 or not. If answer at step 74 is NO, the program returns to the step 70, and repeats the above-mentioned procedures. If one of the answers during steps 70 through 72 is NO, which means that the brake control switch 64 is turned off, the program jumps to step 82. If the answer at step 74 is YES, the controller 60 sends a command signal to the locking-up mechanism 21a of the fluid clutch 21 for cancelling of locking-up as stated in the box labeled 75. Then, the controller sends a command signal to the valve 30 at the step 76 so that fluid passage 25 may be throttled to a predetermined extent while sending a signal at the step 77 to valve 31 so as to close the exhaust passage 4c and open the external atmosphere duct 7. The valve 59 is closed upon a command signal at step 78.

Referring back to FIG. 1, as the valve 59 is closed, the clutch element 51 and the hydraulic clutch 56 are connected to each other. Thereupon, drive power of the crankshaft 15 is transmitted from the crankshaft gear 23 via the first transmission gear 46 and the planetary gear 43 to the sun gear 41 with the rotation being reversed. After that, the drive power is transmitted from the sun gear 41 to the gear 20 while reversing the rotation again. Then the power is transmitted to the epicyclic gear 19 via the fluid coupling 21. The rotation is reversed at the epicyclic gear 19 and the rotative power is transmitted to the power turbine 12, so that the power turbine 12 is rotated in a direction opposite to its direction during normal driving of the vehicle, whereby air is sucked through the duct 7 and the power turbine 12 functions as an air compressor. In addition to the normal exhaust brake, energy consumed by compressing the air by the power turbine serves as braking effort against the engine 1. Therefore, a large braking effort can be applied to the engine 1. At the same time, it is possible to adsorb the energy produced upon reversing the power turbine by constructing the clutch element 51 and the hydraulic clutch 56 in such fashion that sufficient slip may occur between the clutch element 51 and the hydraulic clutch 56.

Referring to FIG. 2 again, it is determined if connection of the hydraulic clutch 56 has lasted three minutes at the step 79. When the answer is NO, the steps 75 through 78 are repeated, so that heat generation in the hydraulic clutch 56 is limited to a predetermined extent and unduly large braking effort is not applied to the engine 1 at one occasion. When the answer at the step 79 is YES, the lock-up mechanism 21a starts functioning. Then, if the brake control switch 64 is still ON at the step 81, i.e., if the control switch 64 is in either position 1 or position 2, the above described control for deceleration is repeated. This repetition of deceleration control makes it possible to gradually reduced the engine rotating speed while suppressing load against the hydraulic clutch 56. When the answer at the step 81 is YES, the control for normal driving is performed. More specifically, the controller 60 outputs command signals to the valves 30, 31 and 59, so as to turn off the hydraulic clutch 56 and close the fluid line 25 and the air duct 7. Thereupon, the power turbine 2 starts rotating in a normal sense with the exhaust gas, so as to recover the energy of the exhaust gas, and the rotative power of normal rotation direction is transmitted to the crankshaft 15 via the planetary gear 29, and other gears 20, 48, 46, and 23.

I claim:

1. A turbo compound engine comprising an engine for a vehicle having a rotatable output shaft and exhaust gas line, a turbocharger having a turbine, a power recovering turbine disposed in the exhaust gas line downstream of the turbine of the turbocharger so as to recover energy of the exhaust gas, an exhaust bypass line bypassing the power recovering turbine, an exhaust brake valve disposed upstream of the exhaust bypass line, a switching valve disposed at an intersection of the bypass line and the exhaust gas line so as to close the exhaust gas line while opening the bypass line during deceleration of the vehicle, an external atmosphere duct connected to a part of the exhaust gas line between an outlet port of the power recovering turbine and the bypass line, a switching valve disposed in said part of the exhaust gas line between an output port of the power recovering turbine and the bypass line so as to close the exhaust gas line while opening the external atmosphere duct during deceleration of the vehicle, a gear train connecting the output shaft of the engine with the power recovering turbine disposed in the exhaust gas line, power reversing means for connecting the output shaft of the engine with the power recovering turbine and for reversingly transmitting the rotative power between the output shaft and the power recovering turbine, hydraulic clutch means disposed in said means for connection of the output shaft of the engine and the power recovering turbine, so that the hydraulic clutch means may slip during predetermined period after connecting of the output shaft of the engine with the power recovering turbine, and a controller switching the exhaust brake valve and switching valves upon deceleration of the vehicle and actuating the hydraulic clutch means.

2. A turbo compound engine of claim 1, wherein said power reversing means comprises a sun gear, a planetary gear engaged with the sun gear, a ring gear having an internal gear engaged with the planetary gear and an external gear engaged with a gear connected to the power recovering turbine, said hydraulic clutch means limited revolution of the planetary gear, a transmission gear supported by a hollow shaft rotating with the ring gear via a one way clutch so as to engage with a gear of said output shaft, and a transmission gear rotating with a shaft of the sun gear extending through the hollow shaft.

3. A turbo compound engine of claim 2, wherein said hydraulic clutch means includes a clutch plate attached to a carrier of the planetary gear, a clutch plate coupled with said clutch plate, and an actuator coupling and decoupling said two clutch plates with each other based on oil pressure supplied thereto.

4. A turbo compound engine of claim 2, wherein said hydraulic clutch means includes a clutch plate attached to a carrier of the planetary gear, a clutch plate coupled with said clutch plate, and an actuator coupling and decoupling said two clutch plates with each other based on oil pressure supplied thereto.

5. A turbo compound engine of claim 1, wherein said controller produces command signals to close the exhaust brake valve, to actuate the switching valve disposed in the bypass line and the switching valve disposed downstream of the power recovering turbine, and to actuate the clutch means for coupling.

6. A turbo compound engine, comprising:

reversing means, disposed in a gear train connecting an output shaft of an engine to a power recovering turbine disposed in an exhaust gas line of the engine, for allowing the power recovering turbine to rotate in opposite directions, whereby the engine receives rotational power from the power recovering turbine when the power recovering turbine rotates in one of said directions and the power recovering turbine receives rotational power from the engine when the power recovering turbine rotates in the other of said directions; and hydraulic clutch means within said reversing means for providing slippage during a predetermined period during engagement of the hydraulic clutch means.

7. A turbo compound engine of claim 6, wherein said reversing means includes a planetary gear having a carrier, and said hydraulic clutch means includes a first clutch plate attached to the carrier of the planetary gear, a second clutch plate coupled with said first clutch plate, and an actuator for coupling and decoupling said first and second clutch plates.

8. A turbo compound engine of claim 6, wherein said exhaust gas line has a bypass line bypassing said power recovering turbine, an exhaust brake valve is disposed upstream of the bypass line, a switching valve is disposed at an intersection of the bypass line and the exhaust gas line so as to close the exhaust gas line while opening the bypass line during deceleration of the vehicle, an external atmosphere duct is connected to a part of the exhaust gas line between the bypass line and the outlet port of the power recovering turbine, and a switching valve is disposed at said part of the exhaust gas line so as to close said part of the exhaust gas line while opening the external atmosphere duct.

9. A turbo-compound engine of claim 8, wherein said power reversing means includes a planetary gear having a carrier, and said hydraulic clutch means includes a clutch plate attached to the carrier, first and second clutch plates coupled together, and an actuator for coupling and decoupling said clutch plates with each other based on oil pressure supplied thereto.

10. A turbo compound engine of claim 6, wherein said power reversing means comprises a sun gear, a planetary gear engaged with the sun gear, a ring gear having an internal gear engaged with the planetary gear and an external gear engaged with a gear connected to the power recovering turbine, said hydraulic clutch means limiting revolution of the planetary gear, a transmission gear supported by a hollow shaft rotating with the ring gear via a one way clutch so as to engage with a gear of said output shaft, and a transmission gear rotating with a shaft of the sun gear extending through the hollow shaft.

11. A turbo compound engine of claim 10, wherein said hydraulic clutch means includes a clutch plate attached to a carrier of the planetary gear, a clutch plate coupled with said clutch plate, and an actuator coupling and decoupling said two clutch plates with each other based on oil pressure supplied thereto.

* * * * *